US009569745B1

United States Patent
Ananthanarayanan et al.

(10) Patent No.: US 9,569,745 B1
(45) Date of Patent: Feb. 14, 2017

(54) DYNAMIC VEHICLE ROUTING FOR REGIONAL CLUSTERS

(71) Applicant: Amazon Technologies, Inc., Seattle, WA (US)

(72) Inventors: Kalyanakrishnan Ananthanarayanan, Bellevue, WA (US); Rajiv Kumar Poddar, Hyderabad (IN); Tej Paul Verma, Hyderabad (IN); Sushanta Das, Hyderabad (IN); Ankit Kumar Yadav, Hyderabad (IN); Eric Yuk-Hon Kan, Seattle, WA (US); Mark Robert Michener, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/810,315

(22) Filed: Jul. 27, 2015

(51) Int. Cl.
*G01C 21/34* (2006.01)
*G06Q 10/08* (2012.01)

(52) U.S. Cl.
CPC ............ *G06Q 10/083* (2013.01); *G01C 21/34* (2013.01); *G06Q 10/087* (2013.01)

(58) Field of Classification Search
CPC ...... G01C 21/34; G06Q 10/083; G06Q 10/087
USPC ........................................................ 701/533
See application file for complete search history.

(56) References Cited

U.S. PATENT DOCUMENTS

| 7,801,904 | B2* | 9/2010 | Natesan | G01C 21/32 701/533 |
| 2003/0069814 | A1* | 4/2003 | Hoffman | G06Q 10/06 705/28 |
| 2005/0256731 | A1* | 11/2005 | Mougey | G06Q 10/08 705/337 |
| 2006/0253245 | A1* | 11/2006 | Cera | G06F 3/04815 701/117 |
| 2008/0154720 | A1* | 6/2008 | Gounares | G01C 21/343 705/14.4 |
| 2008/0214166 | A1* | 9/2008 | Ramer | G06Q 30/0257 455/414.3 |
| 2008/0275643 | A1* | 11/2008 | Yaqub | G06Q 10/047 701/412 |
| 2008/0294996 | A1* | 11/2008 | Hunt | G06Q 30/02 715/739 |
| 2010/0042463 | A1* | 2/2010 | Brockman | G06Q 10/08 705/30 |
| 2011/0022424 | A1* | 1/2011 | VonDerheide | G01C 21/20 705/5 |
| 2011/0029233 | A1* | 2/2011 | Carpenter | G01C 21/3469 701/533 |

(Continued)

*Primary Examiner* — Atul Trivedi
(74) *Attorney, Agent, or Firm* — Kilpatrick Townsend & Stockton LLP

(57) ABSTRACT

Techniques described herein are directed towards dynamically adding new pickup orders to an existing route structure. In at least some embodiments, a service provider separates a number of vendors into separate clusters based on one or more attributes. For example, the vendors may be separated by geographic region. The service provider may then identify a set of routes that are associated with each of the vendor clusters and run optimization techniques on that set of routes. The set of routes may be filtered based on attributes of the route. In some embodiments, the service provider may make a route alteration that accommodates the new pickup order.

22 Claims, 8 Drawing Sheets

(56) References Cited

U.S. PATENT DOCUMENTS

| | | | |
|---|---|---|---|
| 2011/0238289 A1* | 9/2011 | Lehmann | G01C 21/3438 |
| | | | 701/533 |
| 2012/0130638 A1* | 5/2012 | Uyama | G01C 21/34 |
| | | | 701/533 |
| 2012/0253908 A1* | 10/2012 | Ouimet | G06Q 30/06 |
| | | | 705/14.23 |
| 2013/0131987 A1* | 5/2013 | Soelberg | G01C 21/00 |
| | | | 701/533 |
| 2013/0325319 A1* | 12/2013 | Moore | G01C 21/36 |
| | | | 701/412 |
| 2014/0136107 A1* | 5/2014 | Pfeifle | G01C 21/32 |
| | | | 701/533 |

* cited by examiner

DYNAMIC VEHICLE ROUTING FOR REGIONAL CLUSTERS

BACKGROUND

Fulfillment centers may receive inventory from a number of different vendors. When the fulfillment center is responsible for collecting this inventory, efficient route management can become nearly impossible. This is especially true when some of the vendors are individuals or one-time sellers, as is frequently the case with online sales fulfillment. As the number of online merchants continues to increase, these challenges are only amplified.

BRIEF DESCRIPTION OF THE DRAWINGS

Various embodiments in accordance with the present disclosure will be described with reference to the drawings, in which.

DETAILED DESCRIPTION

Figure 1:
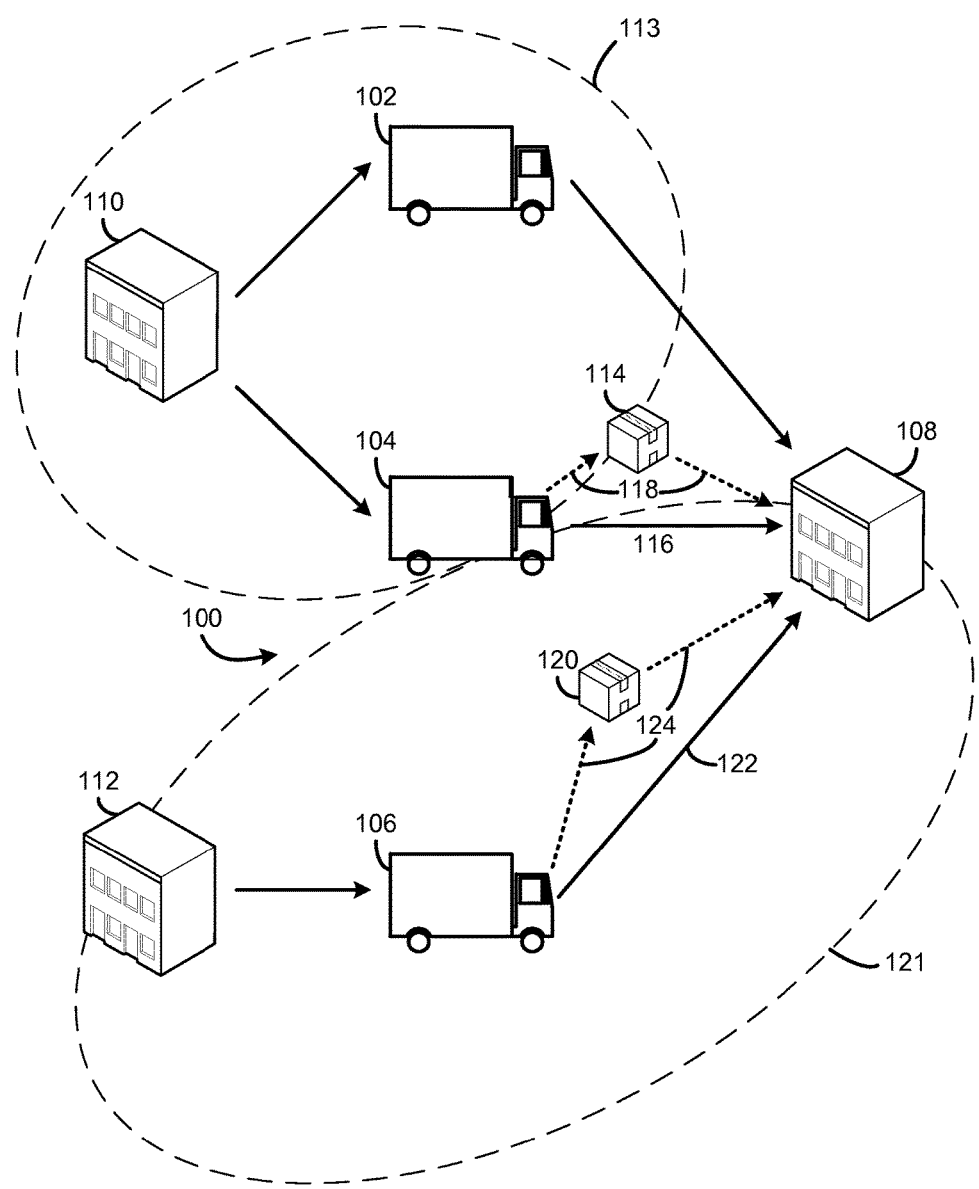
FIG. 1 depicts an illustrative example pickup assignment method in accordance with at least some embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to dynamically adding inbound shipments from vendors to existing routes. In particular, the disclosure is directed to assigning inbound pickups to an appropriate route as the inbound pickups are scheduled. In some embodiments, one or more vendors may be grouped or clustered by region and a processor device may separately process the routes associated with that region. In some embodiments, routes may be planned on a per region basis.

In an illustrative example, a service provider may receive inbound shipments from a multitude of vendors located throughout the world. In this example, the service provider may be responsible for physically picking up the inbound shipments from each vendor. To do this efficiently, the vendors may be grouped locally, such as by region. Each region may then be associated with a set of pickup routes (also called lanes). When one of the vendors indicates a shipment is ready to be picked up, the service provider may perform a number of optimization techniques on each of the pickup routes associated with the vendor's region in order to determine which pickup route should be altered to include a pickup of the shipment. By separating the vendors by region, the service provider makes the optimization more computationally feasible. Additionally, this allows dynamic updating of route and shipment information.

In accordance with at least some embodiments, vendors may be clustered by geographic region. For example, the service provider may identify shipment origination regions that have a high concentration of vendors. In this example, the service provider may put each of the shipment regions into a separate cluster. In some embodiments, the service provider may associate particular routes with a region cluster. For example, a pickup route may be associated with the region cluster in which it originates, passes through, or has a pickup. When a particular vendor indicates that a shipment is ready to be picked up, the service provider may identify the region associated with the vendor, identify the routes associated with that region, and select the route that is most appropriate for fulfilling the shipment pickup. In at least some embodiments, a new vendor may be associated with a region cluster when it indicates that a shipment is ready to be fulfilled. For example, a third party entity may indicate that he or she has an item to sell via an electronic marketplace and request pickup. In this example, the service provider of the electronic marketplace may provide shipment and fulfillment services. The service provider may determine the region cluster associated with the third party entity based on the third party entity's distance to a cluster's center (centroid). The service provider may also select a pickup route, from those that service the region cluster, to fulfill the request.

In accordance with at least some embodiments, the service provider may run one or more optimization techniques on the associated pickup routes in order to identify an optimal route for fulfilling an order pickup. In some embodiments, the service provider may alter more than one route. For example, in at least some embodiments, the service provider may recalculate each of the pickup routes associated with the region cluster. In at least some embodiments, each region may be processed by a separate server or processing device. In these embodiments, multiple routes may be calculated in parallel.

Although this disclosure focuses on pickup routes including inbound shipment orders, it should be recognized that this is only for illustrative purposes. One skilled in the art would recognize that the described regional clustering processes and route planning processes may be applied to other transportation/logistics processes. For example, the techniques described in this disclosure may equally apply to order delivery, pickup of customer returns, transportation of goods between fulfillment centers, and/or any other suitable vehicle routing process.

FIG. 1 depicts an illustrative example pickup assignment method 100 in accordance with at least some embodiments of the disclosure. In FIG. 1, several delivery vehicles 102, 104, and 106 are depicted on routes to a fulfillment center 108. The delivery vehicles may be dispatched from fulfillment center 108 or a number of other fulfillment centers 110 and 112.

In accordance with at least some embodiments, a request related to order shipment 114 may be received by a service provider. In this example, the service provider may identify a region cluster 113 in which the shipment pickup is to be made. The service provider may then determine that delivery vehicles 102 and 104 pass through the region cluster 113. The service provider may then determine that, between the available delivery vehicles, it is more desirable for delivery vehicle 104 to pick up order shipment 114. The determination may be based at least in part on cost, pickup times, delivery estimates, service level agreements (SLAs), combinations of the foregoing or the like. Upon making this determination, the service provider may alter delivery vehicle's current pickup route 116 to a new route 118 in order to fulfill pickup of the order shipment 114.

By way of further illustration, the service provider may receive a second request related to order shipment 120. In this example, the service provider may identify that order shipment 120 is associated with a second region cluster 121. The service provider may then determine that delivery vehicles 104 and 106 pass through this second region cluster 121. Once again, the service provider may determine which available vehicle should pick up the order (e.g., in order to minimize costs, travel distance, travel time, etc.). In this example, the service provider may compare the current pickup route 122 of the delivery vehicle 106 to the new pickup route 118 of the delivery vehicle 104. Although pickup route 116 may have been the optimal choice for picking up order shipment 120, the new pickup route 118 may be less than optimal. Upon making this determination, the service provider may alter delivery vehicle's 106 current pickup route 122 to a new route 124 in order to fulfill pickup of the order shipment 120.

In some embodiments, the service provider may elect to add a pickup to a particular route based on the accessibility of the pickup location and the type of vehicle assigned to the pickup route. For example, a small pickup order may be serviced by a bicycle messenger that is scheduled to pick up other orders in the area, but a large pickup order may require a delivery truck. By way of a second example, a pickup order may require a forklift to be loaded onto a delivery vehicle. In this example, a larger vehicle may be required to collect the pickup order.

Figure 2:
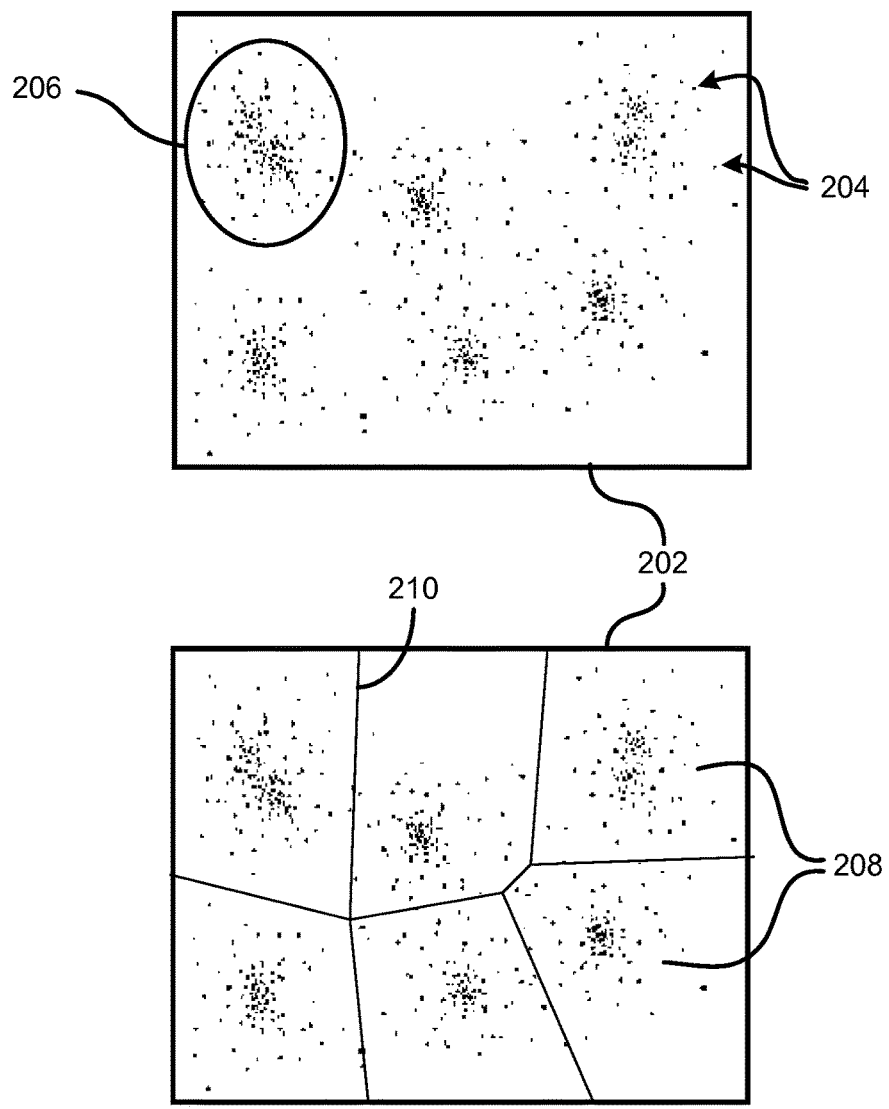
FIG. 2 depicts an illustrative vendor clustering technique that may be performed by a clustering module in accordance with at least some embodiments.

FIG. 2 depicts an illustrative vendor clustering technique that may be performed by a clustering module in accordance with at least some embodiments. In FIG. 2, a geographic region 202 is depicted. As illustrated, multiple individual pickup locations 204 may be dispersed throughout geographic region 202. A pickup location 204 may be any address or location that is associated with a vendor and at which a pickup has been scheduled (either currently or in the past), as well as forecasted pickups in the future. A particular geographic region 202 may be of any size. For example, the geographic region may include the entire United States.

In accordance with at least some embodiments, the clustering module may identify high density pickup areas 206 within the geographic region 202. For example, a high density pickup area 206 may consist of a warehouse or industrial district within a city or other urban area. In some embodiments, a high density pickup area 206 may include an entire city or region. Once the service provider has identified a number of high density pickup areas 206, the service provider may break the geographic area 202 into regional clusters 208. In some embodiments, boundary lines 210 for regional clusters 208 may run along natural barriers (e.g., a river or a mountain range). In some embodiments, regional clusters 208 may be constrained by man-made boundaries. For example, a service provider may separate the geographic area 202 into regional clusters 208 that each include an area constrained by one or more postal codes (e.g., three zip codes or the like). In some embodiments, a clustering module of the service provider may use a clustering algorithm (e.g., k-means clustering) to assign regional clusters 208. For example, the service provider may assign a number of centroids to the geographic area 202 such that the distance between each of the pickup locations 204 and the centroids are minimized. In this example, a regional cluster 208 is formed by assigning each pickup location 204 to the closest centroid. The points that are equally close to two or more centroids then form a centroid boundary 210. The service provider may adjust the number of centroids, which would result in a movement of cluster boundaries and an increase or decrease in the number of regional clusters 208.

Once regional clusters have been created, they may be persisted for some duration. In other words, regional clusters may remain fixed for some period of time (one day, one month, one year, etc.) before being recalculated. In at least some embodiments, the duration may be dependent on a continuity of the volume of vendors, or how quickly the vendor population changes. For example, a service provider that primarily collects orders from the same set of vendors each time may persist regional clusters for a longer duration than a service provider that primarily collects orders from one-time vendors and/or individuals selling personal items. By way of further example, if a service provider selects new vendors and renews vendor contracts on a yearly basis, then it may also make sense for that service provider to persist regional clusters for the length of the contracts. In this example, the service provider may use the clustering module to recalculate regional clusters every year shortly after the new vendors are selected and any vendor contracts are renewed. By persisting regional clusters in this fashion, the service provider may be able to plan routes and secure carrier capacity far in advance. Additionally, the service provider may utilize regularly scheduled routes. For example, a particular set of vendors may provide goods every two weeks. In this example, the service provider may have a regularly scheduled pickup route to collect these goods. At the time that a new pickup order is requested, the service provider may have a number of routes already in place within a particular regional cluster. By adding the new pickup order to one of these already existing pickup routes, the service provider may be prevented from paying higher costs associated with securing last-minute resources. Additionally, it allows a service provider to better utilize delivery vehicle capacity, reducing overall shipping costs and transit times.

In at least some embodiments, the service provider may persist regional clusters until it detects a change in at least one high-density pickup area 206. For example, the service provider may detect that pickup orders from a high-density pickup area 206 have significantly decreased. In response, the service provider may use the clustering module to recalculate regional clusters. Alternatively, the service provider may detect a large number of new pickup orders associated with a particular location. The service provider may then determine that this is a new high density pickup area 206 and may use the clustering module to recalculate regional clusters. In some embodiments, a number of clusters associated with the clustering technique (e.g., k in a k-means clustering algorithm) may be dependent on the number of high density pickup areas detected by the service provider. In these embodiments, the number of clusters may be adjusted along with the number of high density pickup areas.

In some embodiments, the size of each regional cluster may be adjusted to include more or fewer pickup locations 204. For example, the service provider may set a maximum or minimum number of pickup locations that are to be included in each regional cluster 208. In some embodiments, as the number of total pickup locations changes, the number of centroids may be adjusted and regional cluster boundaries 210 reassigned.

Figure 3:
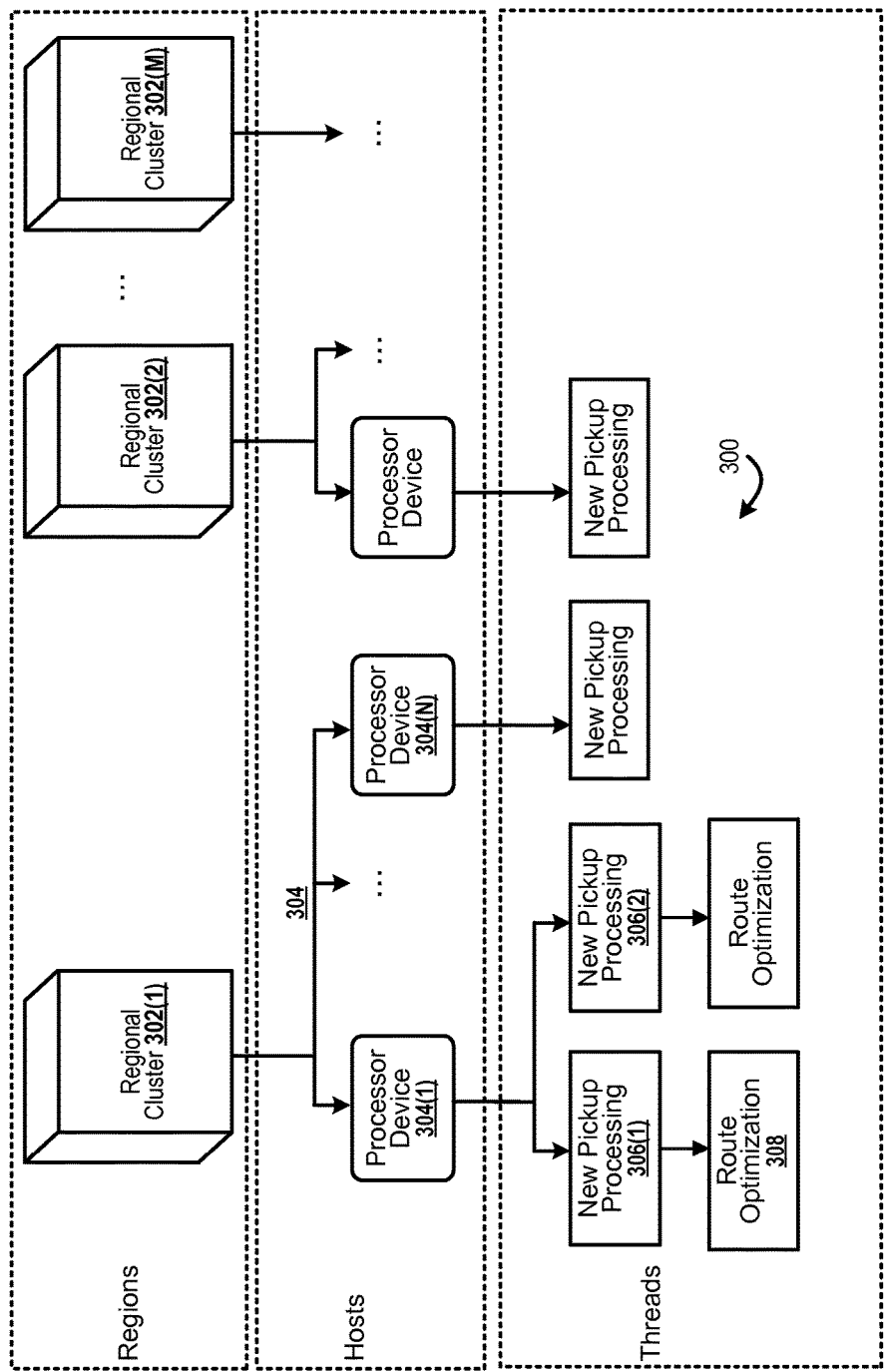
FIG. 3 depicts an illustrative example of dynamic vehicle routing that may be implemented for a regional cluster in accordance with at least one embodiment.

FIG. 3 depicts an illustrative example of dynamic vehicle routing that may be implemented for a regional cluster in accordance with at least one embodiment. In FIG. 3, a geographic area has been separated into a number of regional clusters 302(1-M). In this example, M may be the total number of regional clusters created by a clustering module as described in the previous figure. Each regional cluster 302(1-M) may be assigned a set of processor devices 304. For example, a single regional cluster 302(1) may be assigned processor devices 304(1-N). In some embodiments, N is determined based on a number of pickup locations or a number of routes currently assigned to the regional cluster 302(1). Although FIG. 3 depicts each of regional clusters 302(1-M) being processed by one or more separate processors, some embodiments of the disclosure may include one or more of regional clusters 302(1-M) being processed on a shared processor or set of processor devices 304.

In some embodiments, a set of routes may be identified for a particular regional cluster. For example, each pickup that is scheduled to occur within the cluster may be associated with one or more routes. The set of routes for a regional cluster may include all of the routes associated with scheduled pickups within that cluster. Additionally, routes may manually be assigned to a particular cluster. In some embodiments, the set of routes may include routes that pass through a regional cluster. For example, a route may be associated with each geographic area through which it passes. If the regional cluster contains the geographic area passed through by a route, then that route may be included in the set of routes. Each route may be associated with multiple regional clusters.

In some embodiments, each of processor devices 304(1-N) may be used to process one or more new pickups 306. In some embodiments, each new pickup 306 may be processed on a separate thread of a processor device. In accordance with at least some embodiments, a processor device may process a new pickup by running one or more route optimizations 308 on the identified set of routes. In some embodiments, a separate thread may be used to run different optimization techniques for the same new pickup 306. In some embodiments, the processor device may only be provided with the identified set of routes and pickup locations associated with the regional cluster in order to increase computational efficiency, while one or more other processor devices may only be provided with the identified set of routes and pickup locations associated with one or more other regional clusters, which processor devices may proceed with processing separately and/or in parallel.

Figure 4:
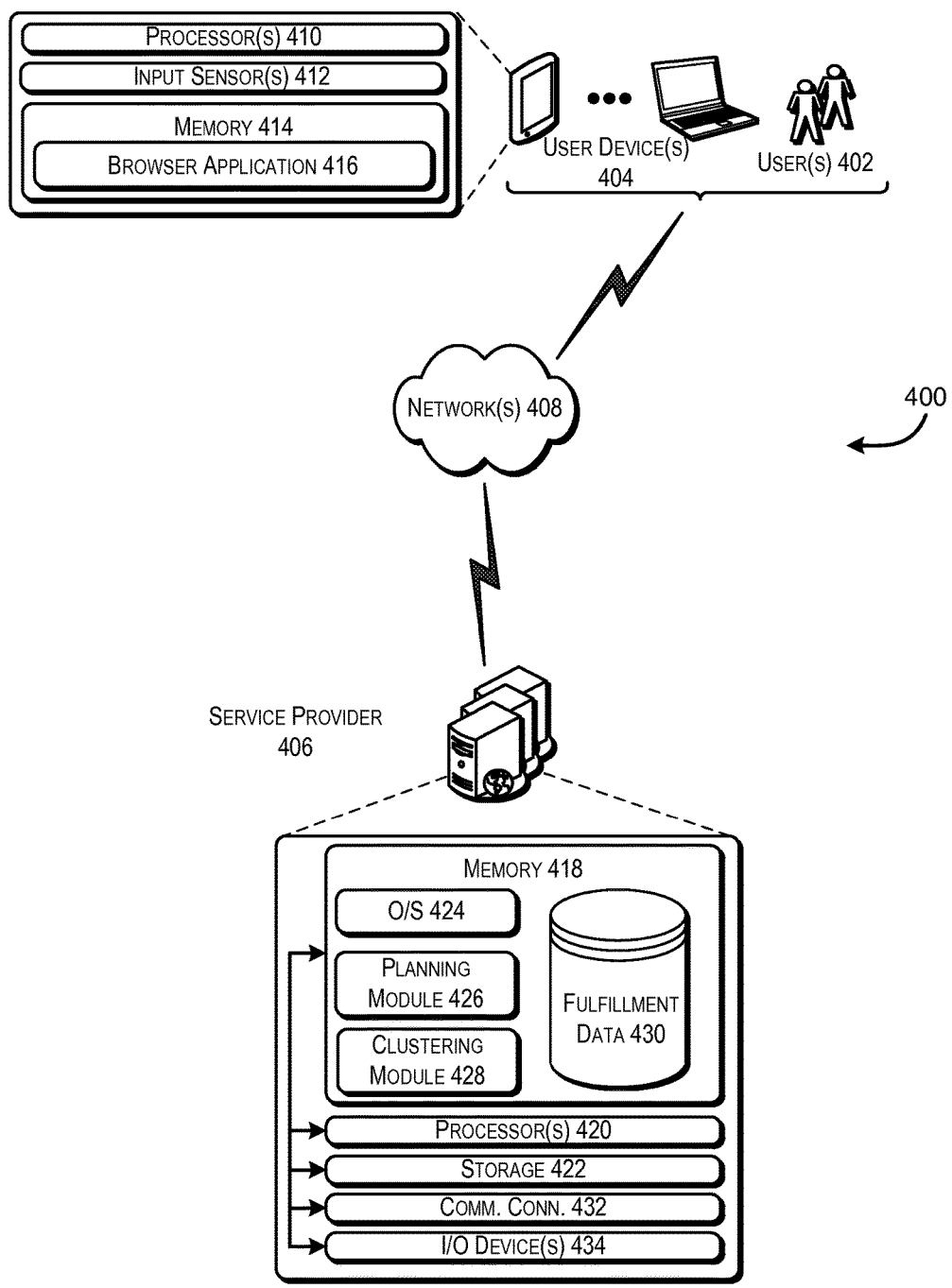
FIG. 4 depicts an illustrative example of a system or architecture in which techniques for dynamically assigning a new order to pickup routes may be implemented in accordance with at least some embodiments.

FIG. 4 depicts an illustrative example of a system or architecture 400 in which techniques for dynamically assigning a new order to pickup routes may be implemented in accordance with at least some embodiments. In architecture 400, one or more consumers and/or users 402 may utilize user devices 404. In some examples, the user devices 404 may be in communication with a service provider 406 via the network(s) 408, or via other network connections.

The user devices 404 may be any type of computing device such as, but not limited to, a mobile phone, a smart phone, a personal digital assistant (PDA), a laptop computer, a desktop computer, a server computer, a thin-client device, a tablet PC, etc. Additionally, user devices 404 may be any type of wearable technology device, such as an earpiece, glasses, etc. The user device 404 may include one or more processors 410 capable of processing user input. The user device 404 may also include one or more input sensors 412 for receiving user input. As is known in the art, there are a variety of input sensors 412 capable of detecting user input, such as accelerometers, cameras, microphones, etc. The user input obtained by the input sensors may be from a variety of data input types, including, but not limited to, audio data, visual data, or biometric data. Embodiments of the application on the user device 404 may be stored and executed from its memory 414.

In some examples, the network(s) 408 may include any one or a combination of many different types of networks, such as cable networks, the Internet, wireless networks, cellular networks, and other private and/or public networks. While the illustrated example represents the users 402 accessing the browser application 416 over the network(s) 408, the described techniques may equally apply in instances where the users 402 interact with a service provider 406 via the user device 404 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 416 may allow the users 402 to interact with a service provider 406, such as to store, access, and/or manage data, develop and/or deploy computer applications, and/or interact with web content. The one or more service providers 406, perhaps arranged in a cluster of servers or as a server farm, may be configured to host a website (or combination of websites) viewable via the user device 404 or a web browser accessible by a user device 404 via the browser application 416. Although depicted in memory of the user device 404 in this example, in some embodiments the browser application 416 may be hosted at a server. For example, the user device 404 may be a thin client device capable of accessing a browser application 416 remotely. The browser application 416 may be capable of handling requests from many users 402 and serving, in response, various user interfaces that can be rendered at the user device 404 such as, but not limited to, a web site. The browser application 416 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 416, such as with other applications running on the user device 404.

The service provider 406 may be implemented by any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 406 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 406 may include at least one memory 418 and one or more processing units (or processor(s)) 420. The processor(s) 420 may be implemented as appropriate in hardware, computer-executable instructions, firmware or combinations thereof. Computer-executable instruction or firmware implementations of the processor(s) 420 may include computer-executable or machine executable instructions written in any suitable programming language to perform the various functions described.

The memory 418 may store program instructions that are loadable and executable on the processor(s) 420, as well as data generated during the execution of these programs. Depending on the configuration and type of service provider 406, the memory 418 may be volatile (such as random access memory (RAM)) and/or non-volatile (such as read-only memory (ROM), flash memory, etc.). The service provider 406 may also include additional storage 422, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 418 may include multiple different types of memory, such as static random access memory (SRAM), dynamic random access memory (DRAM) or ROM. Turning to the contents of the memory 418 in more detail, the memory 418 may include an operating system 424 and one or more application programs or services for implementing the features disclosed herein including at least a module for identifying one or more optimized routes (planning module 426) and/or a module for clustering item pickup locations or vendors based on one or more attributes (clustering module 428). The memory 418 may also include fulfillment data 430, which provides information related to routes, scheduled pickups, and item inventory. In some embodiments, the fulfillment data 430 may be stored in a database.

The memory 418 and the additional storage 422, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 404 or the service provider 406. The service provider 406 may also contain communications connection(s) 432 that allow the service provider 406 to communicate with a stored database, another computing device or server, user terminals, and/or other devices on the network(s) 408. The service provider 406 may also include input/output (I/O) device(s) and/or ports 434, such as for enabling connection with a keyboard, a mouse, a pen, a voice input device, a touch input device, a display, speakers, a printer, etc.

Turning to the contents of the memory 418 in more detail, the memory 418 may include an operating system 424, a database containing fulfillment data 430 and the one or more application programs or services for implementing the features disclosed herein, including a planning module 426 and/or a clustering module 428.

In some embodiments, the planning module 426 may be configured to receive pickup scheduling data, as well as information related to current routes, and identify a potentially optimum route. For example, in some embodiments, the planning module 426 may revise a number of available routes to include a newly scheduled pickup. The planning module 426 may then determine which of the newly revised routes has, for example, the least increase in overall cost, the least increase in travel distance, or the least increase in required resources. Alternatively, the planning module 426 may periodically create a completely new set of routes based on current pickup information. For example, the planning module 426 may construct one or more sets of routes that encompass each of the pickups and from those sets, select the set of routes that is, for example, least costly, least travel distance or least required resources. In this example, the addition of a new pickup may cause changes to several existing routes. It should be appreciated that a number of routing techniques are known in the art and any method of creating a pickup route, or set of pickup routes, should be treated as an equivalent.

In some embodiments, the clustering module 428 may be configured to receive pickup location data and identify various regions associated with high density pickup areas. Pickup location data may be related to historical pickup data, manually entered pickup data, purchase order data, and/or forecast data. Based on this pickup location data, the clustering module 428 may create multiple regional clusters within a geographic location, each of which may be processed by one or more separate processing devices. One role of the clustering module 428 may be to identify appropriate regional clusters within a larger geographic area. Although the clustering module 428 may utilize one or more clustering techniques to do this (described above with respect to FIG. 2), it may also assign regional clusters based on logical boundaries (e.g., geographic boundaries and/or man-made boundaries). For example, the clustering module 428 may identify one or more zip codes that include a high density pickup area, and may assign the one or more zip codes as a regional cluster. By separating a larger geographic area into separate regional clusters, the service provider may be able to utilize the planning module 426 with respect to only those pickup routes relevant to the regional cluster instead of all pickup routes. In this way, the described technique provides a distributed solution to an NP-hard problem. In utilizing the described technique, computational efficiency of route planning may be increased exponentially.

The fulfillment data 430 may be predetermined or it may be dynamically generated. In some embodiments, fulfillment data 430 may contain route information related to a number of pickup locations. For example, a number of pickups may already each be assigned to a pickup route. In this example, the fulfillment data 430 may store the route information, the pickup information, and information about a relationship between the two. Fulfillment data 430 may also include purchase history or item trend data that may be used to forecast item demand.

Figure 5:
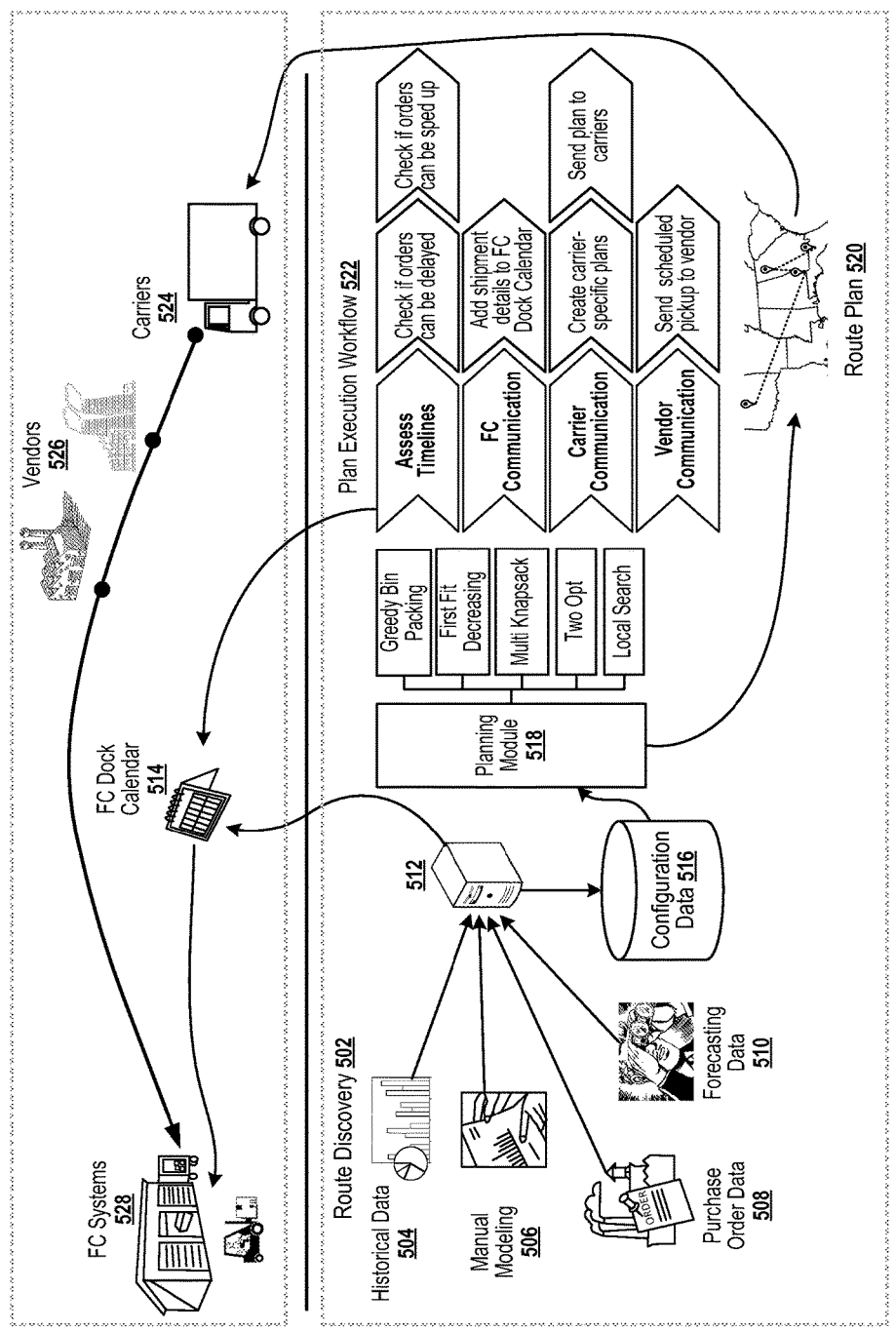
FIG. 5 depicts an illustrative example of an inbound vehicle routing platform that dynamically adds a new order to pickup routes.

FIG. 5 depicts an illustrative example of an inbound vehicle routing platform 500 that dynamically adds a new order to pickup routes. In at least some embodiments, the planning platform 500 that handles a particular vendor's pickups is specific to that vendor's pickup location or the regional cluster that includes that vendor's pickup location. In particular, the planning platform 500 that processes a particular vendor's pickups is one that processes each pickup in the same regional cluster. To do this, each potential route for a regional cluster must be identified for potential analysis. This may be done using route discovery 502 techniques.

In at least some embodiments, route discovery 502 may involve analyzing existing routes and vendors, such as those used in the past (extracted from historical data 504) and those entered through manual modeling 506 (routes or vendors entered into the system and associated with the regional cluster by a user). Additionally, purchase order data 508 may be used to determine what items are currently on order or will become available for pickup in the future. In some embodiments, forecasting data 510 may be used to determine demand trends or inventory depletion rates that may be used to identify items that might need to be ordered soon. Vendors associated with those items may then be identified. Once each vendor (potential and real) is identified in this fashion, routes associated with that vendor may be discovered.

In at least some embodiments, discovered routes may be provided to one or more processor devices 512. In accordance with at least some embodiments, collected route information may also be provided to a fulfillment center dock calendar 514 that tracks shipment receiving dates at a fulfillment center. In some embodiments, routes may be configured according to configuration data 516. For example, routes may be configured to avoid main roads and/or high traffic areas. In some embodiments, routes may be configured to reduce the number of left-hand turns made by the delivery vehicle. In at least some embodiments, configuration data 516 may include settings that are specific to a type of delivery vehicle associated with the delivery route. For example, if a route includes a semi-truck as the delivery vehicle, the route may be configured according to the configuration data 516 related to the types of roads and highways that semi-trucks may utilize (e.g., to avoid narrow roads, certain tunnels or overpasses, etc.). In some embodiments, configuration data 516 that is relevant to a particular route may be provided to planning module 518.

In at least some embodiments, a planning module 518 may use one or more optimization techniques, as well as any relevant configuration data 516, to determine an appropriate route to which a new pickup is to be added. In accordance with at least some embodiments, planning module 518 is an example planning module 426 as depicted in FIG. 4. In at least some embodiments, multiple optimization techniques may be run and the results of each technique may be analyzed to select an appropriate route. In at least some embodiments, multiple optimization techniques may be run in parallel, such as by separate processing devices or on separate threads of a single processing device. Typically, the described optimization techniques are computationally expensive, however, because the dataset being optimized is limited to only those routes relevant to a particular regional cluster, several such optimization techniques may be used to identify an optimal route. For example, some potential optimization techniques may include a greedy algorithm (e.g., a greedy bin packing algorithm), a first fit decreasing algorithm, a multi knapsack algorithm, a two opt algorithm, an exhaustive search algorithm, or a local search algorithm. Additionally, one skilled in the art would recognize that there are several equivalent optimization algorithms that may be used. In at least some embodiments the optimization techniques may take into account the weight and/or volume of the order. For example, in addition to identifying the most cost or operationally effective route for a particular delivery, the service provider must ensure that the delivery vehicle has the capacity to carry the order. To do this, an optimization technique may determine whether various order pickups must be moved to one or more different routes.

Once optimal route information is identified, a route plan 520 may be constructed by the planning module 518. In some embodiments a plan execution workflow 522 is also created to include directives for making the one or more route changes included in the route plan. In at least some embodiments, the fulfillment center dock calendar 514 may be updated to include data from the plan execution workflow 522. The plan execution workflow 522 may contain several sets of workflow directives that are configured to result in the pickup order being received at the fulfillment center. For example, one set of directives may be focused on assessing timelines for the pickup order. These directives may direct a processing device to determine whether other orders can be delayed to accommodate a new pickup order. For example, prior to assigning a pickup order to a particular route, the service provider may need to determine whether that would cause the delivery vehicle to arrive at the fulfillment center later than is acceptable for the other pickup orders serviced by the route. In another example, upon receiving an indication that a new pickup will be available after a given date, the service provider may determine whether another route can be delayed until that date. In addition to determining whether orders can be delayed, a processing device may also be directed to determine whether orders may be sped up. For example, upon determining that a new pickup order is needed immediately (or within the near future), the service provider may determine whether other pickup orders may be picked up early in order to fill a delivery vehicle.

In some embodiments, a plan execution workflow 522 may direct communications with various entities. For example, the plan execution workflow 522 may communicate with a fulfillment center by directing a processing device to add shipment details to the fulfillment center's dock calendar 514. In another example, the plan execution workflow 522 may communicate with a carrier by directing a processing device to create carrier-specific plans and send those plans to the associated carrier. In another example, the plan execution workflow 522 may communicate with a vendor by directing a processing device to provide pickup scheduling data to the vendor.

The route plan 520 is then provided to at least one carrier 524. A carrier 524 is any transport service or vehicle that makes deliveries or picks up orders. A carrier 524 may be under the employ of the service provider, or it may be controlled by a third party entity. In at least some embodiments, carriers 524 may be dispatched along regular (e.g., a periodically reoccurring) routes. The carriers 524 may be asked to deviate from a regular route or a previously scheduled route in order to make the new pickup at its associated vendor 526. In some embodiments, planning platform 500 may perform the described processes as a new order is received and one or more routes may be updated dynamically. For example, a carrier may be en route to a fulfillment center 528 when a new order is received from a vendor 526. In this example, the service provider may determine that the carrier 524 is optimally situated to make the pickup at the vendor 526 and may update the route provided to the carrier to reflect the new pickup.

Figure 6:
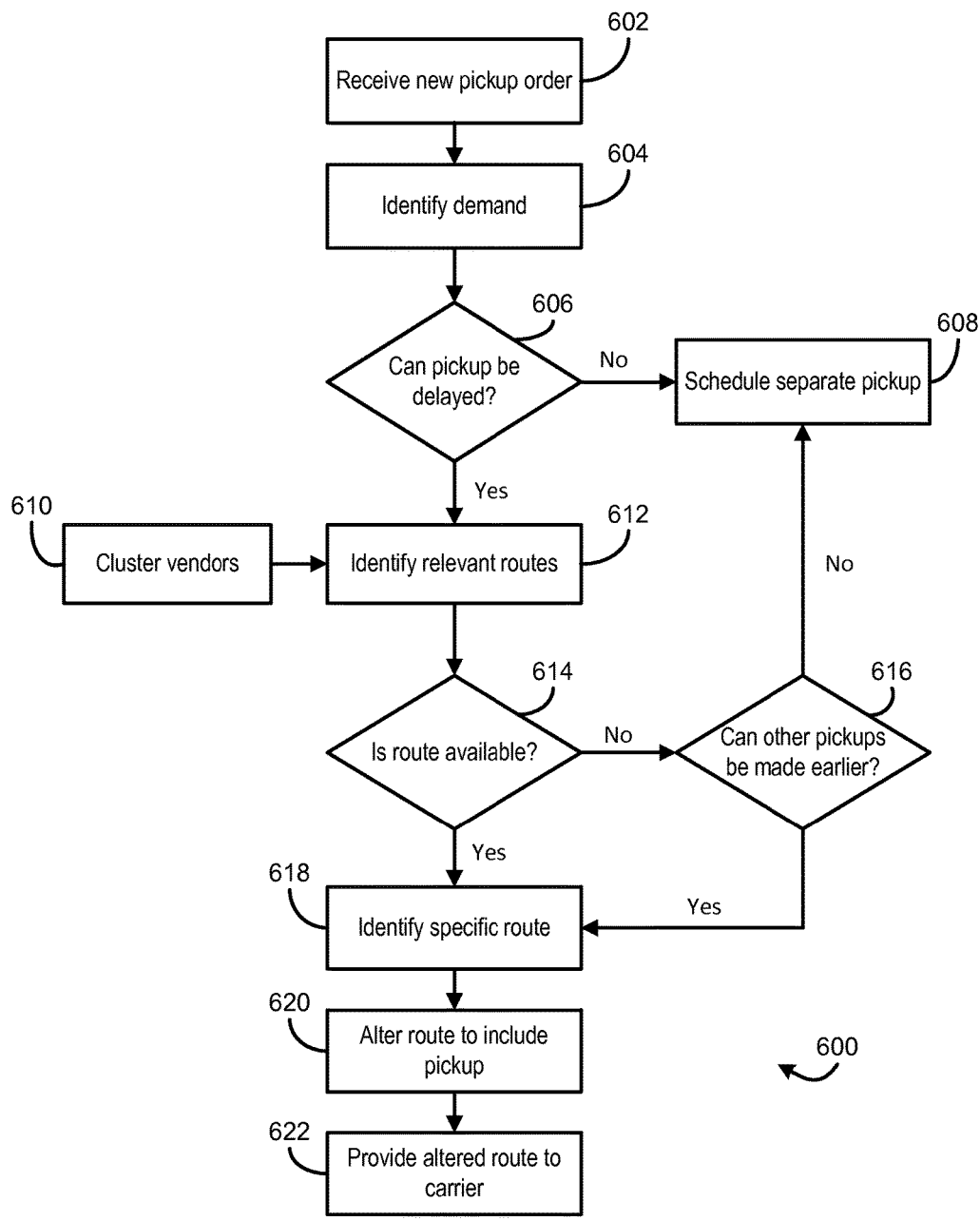
FIG. 6 depicts an illustrative flow chart demonstrating an example route alteration technique in accordance with at least some embodiments.

FIG. 6 depicts an illustrative flow chart demonstrating an example route alteration technique in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more service providers 406 shown in FIG. 4. The code may be stored on a computer-readable storage medium, for example, in the form of a computer program including a plurality of instructions executable by one or more processors. The computer-readable storage medium may be non-transitory.

In accordance with at least some embodiments, process 600 may begin at 602 when a new pickup order is received. In some embodiments, the service provider may identify a product demand for one or more items included with the pickup order at 604. An item's demand may include a date by which the item is predicted to be needed. For example, the service provider may calculate a date upon which the item's inventory is scheduled to be depleted based on a rate at which the item is being purchased by consumers and a current inventory. The service provider may determine, based on the item's demand, whether the pickup can be delayed at 606. If the item is needed immediately (meaning that no delay is acceptable), then the service provider may need to schedule a separate, dedicated pickup for the item at 608.

The service provider may cluster vendors at 610. In some embodiments, the service provider may cluster vendors by one or more attributes of the vendor pickup location. For example, the service provider may cluster vendors by accessibility (what vehicle types are able to access and service a particular vendor), whether a loading dock is present, by geographic region, or by any other suitable attribute of a vendor pickup location. In some embodiments, the service provider may cluster vendors by an attribute of the pickup order. For example, orders that require refrigeration may be placed into a separate cluster. As a second example, orders that require loading via a forklift may be placed into a separate cluster. The service provider may also create subclusters, in which vendors are clustered by two or more attributes. For example, vendors may be clustered based on an order's need for refrigeration as well as the vendor pickup location's geographic region. In some embodiments, process step 610 may be performed in real-time (as new information is received) or it may be performed periodically.

Once the vendors have been clustered by the service provider, the service provider may identify one or more routes associated with the vendor pickups of a particular cluster at 612. For example, each pickup route that services a vendor within the regional cluster may be identified and added to a set of routes. In some embodiments, each of the routes may be associated with a date and time upon which a delivery vehicle associated with the route is expected to arrive at a fulfillment center. The service provider may also store an indication of the vehicle's expected location at specific times. In some embodiments, the service provider may monitor delivery vehicles in real-time, via global positioning service (GPS). Once a set of routes has been identified by the service provider, the service provider may filter routes according to whether the route's arrival time is aligned with a demand date for each item within the order. By filtering the routes in this manner, the service provider may determine whether there is an available route at 614. If none of the routes would result in the order arriving by the time that it is needed, the service provider may determine whether other pickups can be made earlier at 616. For example, the service provider may analyze pickup time windows provided by vendors to determine whether orders may be picked up earlier than they are currently scheduled. If this is not the case, then the service provider may schedule a separate, dedicated shipment for the order, as depicted at 608. If, however, some items may be picked up earlier than they are scheduled for, the service provider may calculate new routes to include the earlier pickup times as well as the new pickup order.

Once the service provider is able to determine a subset of routes that may be used to get the order to a fulfillment center by the time that it is needed, the service provider may perform one or more optimization techniques on that subset of routes to identify an optimal route at 618, which may be altered to include the pickup order at 620. In some embodiments, the service provider may perform several route optimization techniques in parallel. In some embodiments, the service provider may shift orders between routes in the set of routes based on weight or volume requirements. For example, the service provider may utilize one or more optimization techniques to construct a whole new set of routes for all of the pickups in a regional cluster using volume and weight constraints of the associated delivery vehicles. In some embodiments, the service provider may merely alter a single route to include the order. Once a set of routes has been created to accommodate the new pickup order, each of the revised routes may be provided to its corresponding carrier at 622, for example, on a periodic or scheduled basis. In some embodiments, the route may not be provided to a carrier until it is on the route. For example, the service provider may only provide an indication of the carrier's next destination at any given time.

In some embodiments, a service provider may reconstruct a number of routes to be associated with a particular cluster. In some cases, it may be beneficial to adjust the number of carriers and/or routes servicing the regional cluster. Prior to constructing a set of routes for a cluster, the service provider may utilize one or more machine learning techniques to estimate a number of routes that may be appropriate for the regional cluster. The service provider may then estimate the types and/or the number of carriers desired to service the cluster and subsequently may construct the set of routes. This allows a service provider to procure capacity in advance and may result in reduced transit time and/or delivery costs.

In determining a number of routes/carriers appropriate for a cluster, the service provider may identify one or more constraints such as capacity (e.g., weight and/or volume), accessibility (the types of vehicles able to access each pickup location), traffic speed (the types of vehicles most appropriate for traffic conditions), or any other suitable constraint factor. For example, the service provider may estimate a number of carriers desired for a cluster based on a total weight and/or volume of the pickups in that cluster. In this example, the total estimated weight and volume constraints for a particular cluster for a period of time may be used to determine the number and types of carriers desired during that period of time. Once carriers have been identified, a set of routes may be constructed for the carriers.

In accordance with at least some embodiments, the service provider may estimate constraint data for a particular cluster using one or more machine learning or pattern recognition algorithms. For example, a service provider may review historical routing data, historical purchase order data, current purchase order data, and/or purchase order forecast data in order to determine present and/or future constraint requirements for a cluster. In this example, the service provider may utilize one or more machine learning algorithms (e.g., a time series modelling algorithm, a regression algorithm, or the like) to forecast the types and number of carriers desired to service the cluster.

Figure 7:
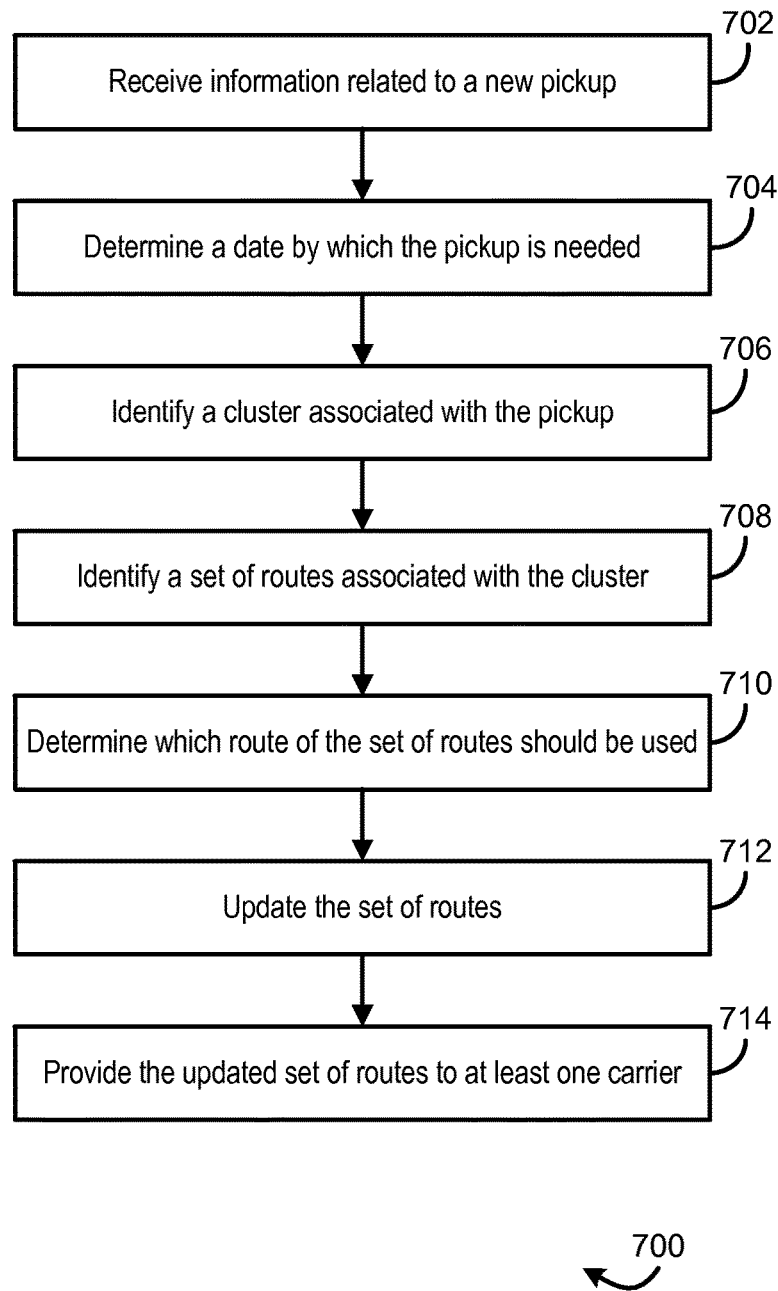
FIG. 7 depicts an illustrative flow diagram depicting an example route updating process in accordance with at least some embodiments.

FIG. 7 depicts an illustrative flow diagram depicting an example route updating process in accordance with at least some embodiments. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the one or more service providers 406 shown in FIG. 4. The code may be stored on a computer-readable storage medium, for example, in the form of a computer program including a plurality of instructions executable by one or more processors. The computer-readable storage medium may be non-transitory.

In accordance with at least some embodiments, process 700 may begin at 702 when information is received by the service provider that a new pickup order is available. The information may include a list of items that are included in the new pickup order, a date upon which the pickup order is available to be picked up, information related to the location of the pickup order, as well as any other suitable information related to the pickup order. In at least some embodiments, the service provider may determine a date by which at least one of the items of the order is needed at 704. For example, the service provider may forecast that an inventory of at least one of the item will be completely depleted within five days. In this example, the service provider may set a need-by date of the current date plus five days.

In accordance with at least some embodiments, the service provider may separate the vendors from which it receives pickup orders into a number of groups or clusters at 706. In some embodiments, the groups may be based on region or geographic location. Once the vendors have each been assigned to a group, any routes associated with the vendor may then be associated with the group at 708. For example, if Vendor A is assigned to a region X, and route 1 and route 2 are both scheduled to result in a collection of separate orders from Vendor A, then both route 1 and route 2 may be associated with region X. The service provider may then determine a particular route to alter in order to include the new pickup order at 710. In some embodiments, only those routes that are associated with a region may be processed via an optimization technique. Processing only these routes by region in this fashion may make running optimization techniques more computationally feasible than running a route optimization on a larger set of routes and/or regions.

In accordance with at least some embodiments, one or more routes in the set of routes may be updated to include the optimization results at 712. For example, the service provider may determine that an assignment of the pickup order to a route 1 would result in a greater cost savings (or a lower cost increase). In this example, the service provider may update the set of routes by replacing the current route 1 with an altered route 1 that includes the new pickup order. In some embodiments, the service provider may construct a new set of routes to replace the current set of routes. For example, the service provider may determine that another set of routes is less costly than, or results in an increase of efficiency over, the current set of routes. In this example, the set of routes may be updated such that the current set of routes is replaced with the new set of routes. Once the set of routes has been updated, the updated route information may be provided to one or more carriers responsible for making pickups of the route at 714. In some embodiments the updated route information may be provided in the form of route guidance or map data.

Figure 8:
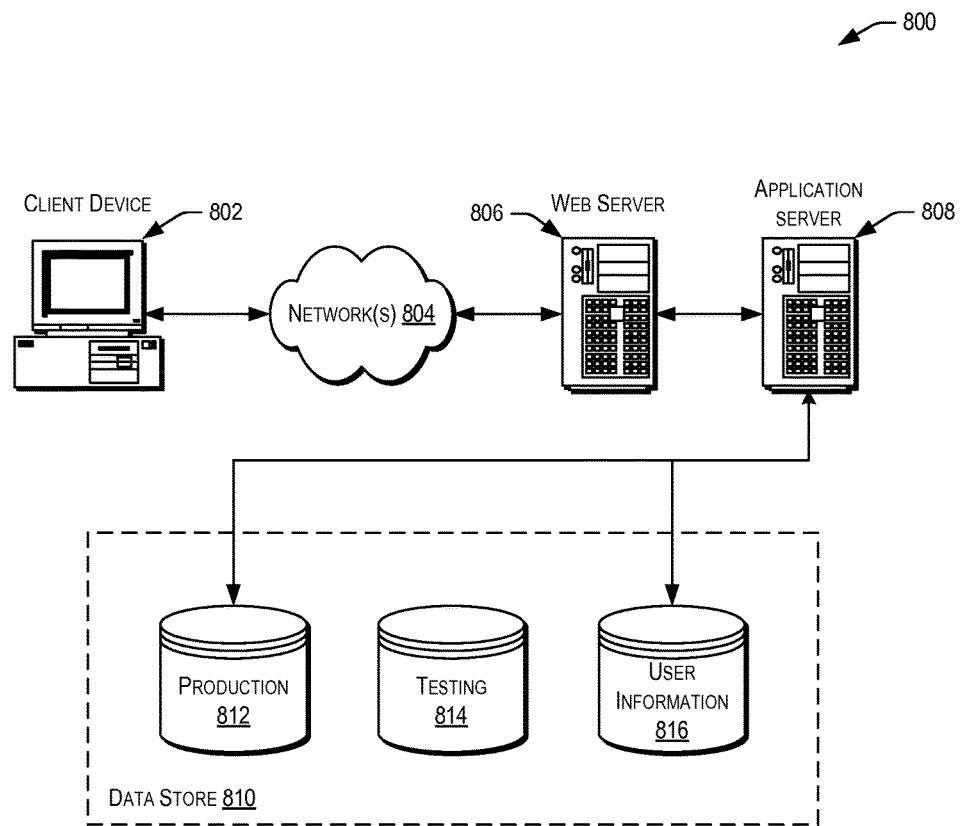
FIG. 8 depicts an illustrative environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving order data including information related to an item, an availability date for the item, an identification of a fulfillment center to receive the item, and location information associated with a pickup of the item;
determining, based at least in part on an inventory demand for the item, a deliver-by date for the item;
identifying, based at least in part on the location information, a regional cluster to be associated with the item, wherein the regional cluster is identified using one or more clustering techniques to determine a centroid from a plurality of centroids to which the pickup of the item belongs, wherein the regional cluster surrounds the determined centroid;

identifying a set of delivery routes related to the availability date, the deliver-by date, and the regional cluster, each of the delivery routes in the set of delivery routes being a previously scheduled delivery route that includes delivery to the fulfillment center;

determining, based at least in part on at least one efficiency metric associated with one or more of the set of delivery routes, a delivery route from the set of delivery routes to include the item; and causing the set of delivery routes to be updated such that the determined delivery route from the set of delivery routes includes a delivery pickup related to the received order data.

2. The computer-implemented method of claim 1, further comprising providing the determined delivery route to a carrier, the carrier being instructed to make the delivery pickup.

3. The computer-implemented method of claim 2, wherein the carrier is a third-party entity.

4. The computer-implemented method of claim 1, wherein the delivery route from the set of delivery routes is determined based at least in part on a weight or a volume of the item.

5. The computer-implemented method of claim 1, wherein locations associated with each of the centroids in the plurality of centroids are recalculated on a periodic basis.

6. The computer-implemented method of claim 1, wherein each of the delivery routes in the set of delivery routes originates somewhere other than the fulfillment center.

7. A system comprising:
a processor; and
a memory including instructions that, when executed with the processor, cause the system to at least:
identify one or more pickup regions, each of the one or more pickup regions associated with a respective plurality of vendors, the pickup regions being identified using one or more clustering techniques to identify a plurality of centroids to which the plurality of vendors belongs, the pickup regions each surrounding an identified centroid;
receive, from a vendor of the plurality of vendors, an indication that an item is available for pickup;
identify, based at least in part on the received indication, a pickup region of the one or more pickup regions associated with the vendor of the plurality of vendors;
identify a set of delivery routes associated with the pickup region;
determine, based at least in part on an efficiency value, a delivery route of the set of delivery routes to include the item available for pickup; and
update the delivery route to include the item available for pickup.

8. The system of claim 7, wherein at least one optimization technique is used to determine the delivery route of the set of delivery routes to include the item available for pickup.

9. The system of claim 8, wherein multiple optimization techniques are used to determine the delivery route of the set of delivery routes to include the item available for pickup, the delivery route of the set of delivery routes determined based at least in part on a result of at least one of the multiple optimization techniques.

10. The system of claim 9, wherein the multiple optimization techniques are performed in parallel.

11. The system of claim 7, wherein the instructions further cause the system to at least:
determine a demand date for the item available for pickup; and
filter the set of delivery routes associated with the pickup region such that the set of delivery routes includes routes that meet the demand date.

12. The system of claim 11, wherein the demand date is determined based at least in part on a depletion rate for the item and a current inventory amount of the item.

13. The system of claim 11, wherein the demand date is determined based at least in part on outstanding orders for the item.

14. The system of claim 7, wherein the set of delivery routes is identified based at least in part on delivery routes of the set of delivery routes being associated with at least one second item available for pickup within the pickup region.

15. The system of claim 7, wherein each of the one or more pickup regions associated with the respective plurality of vendors is defined by one or more geographic boundaries.

16. A non-transitory computer readable medium storing specific computer-executable instructions that, when executed by one or more processors, cause a computer system to perform operations comprising:
identifying, based at least in part on collective pickup data, a plurality of origination regions each associated with a respective plurality of vendor locations, the origination regions being identified using one or more clustering techniques to identify a plurality of centroids to which the plurality of vendor locations belongs, the origination regions each surrounding an identified centroid;
receiving information related to a new item pickup, the information including an indication of an origination region of the plurality of origination regions;
identifying, from a set of pickup routes associated with the origination region of the plurality of origination regions, a pickup route to include the new item pickup, the pickup route being identified based at least in part on a route optimization of the set of pickup routes; and
providing, to a pickup driver associated with the identified pickup route, the information related to the new item pickup.

17. The computer readable medium of claim 16, wherein the collective pickup data includes information related to past pickup locations.

18. The computer readable medium of claim 16, wherein the information related to the new item pickup includes a first time at which the new item pickup becomes available, and wherein the set of pickup routes is identified based at least in part on the first time.

19. The computer readable medium of claim 16, wherein the set of pickup routes associated with the origination region of the plurality of origination regions includes at least one route that passes through the origination region.

20. The computer readable medium of claim 16, wherein the information related to the new item pickup provided to the pickup driver is a route map.

21. The computer readable medium of claim 16, wherein the pickup route is identified from the set of pickup routes associated with the origination region using a first processor of the one or more processors, the first processor being associated with the origination region.

22. The computer readable medium of claim 16, wherein the pickup route is identified based at least in part on a cost associated with the pickup route.

\* \* \* \* \*